Patented Nov. 17, 1942

2,302,228

UNITED STATES PATENT OFFICE 2,302,228

METHOD OF CHLORINATION WITH SULPHURYL CHLORIDE AND PRODUCTION OF MONOCHLORO-TRIMETHYL ACETIC ACID

Morris S. Kharasch and Herbert C. Brown, Chicago, Ill., assignors to E. I. du Pont de Nemours & Company, Wilmington, Del., a corporation of Delaware No Drawing. Application April 2, 1940, Serial No. 327,540

9 Claims. (Cl. 260—539)

This invention relates to a chlorination process and more particularly to a method of chlorination involving the use of sulphuryl chloride and a peroxide catalyst, and to the production of monochloro-trimethyl acetic acid.

This invention has as an object to provide a new method of chlorinating organic compounds which will make possible certain chlorinations which cannot now be run by any other method. A further object is to provide a method of chlorination which may be carried out in the dark. A still further object is to provide a method of chlorination which selectively chlorinates the side chain and not the nucleus of an alkyl substituted benzene. Other objects will appear hereinafter.

These objects are accomplished by the following invention which deals with a process of chlorination in which sulphuryl chloride is reacted with an organic compound in the presence of a peroxide catalyst. Compounds which may be chlorinated with sulphuryl chloride in the presence of a peroxide catalyst include such aliphatic compounds as acyclic hydrocarbons, alicyclic hydrocarbons, alkyl halides, alkylene dihalides, aliphatic aldehydes, aliphatic ketones, aliphatic carboxylic acids, and aliphatic carboxylic acid halides; alkyl esters of organic carboxylic acids; and aromatic compounds such as alkyl substituted benzenes, alkyl substituted phenyl halides, and benzyl halides.

The present invention is based on the discovery that in the presence of organic peroxides sulphuryl chloride can serve as a source of chlorine atoms. By means of this invention it is possible to chlorinate in the dark many types of compounds (paraffin hydrocarbons, side chain aromatic hydrocarbons, alkyl esters of organic carboxylic acids, aliphatic acids, aldehydes and ketones, etc.) far more rapidly and conveniently than is possible by the use of elementary chlorine and light. Under previously known conditions side chains of aromatic compounds have been halogenated but concurrent nuclear halogenation always occurred. It is possible by means of this invention to halogenate almost exclusively in the side chain without this undesirable nuclear halogenation. The fact that this reaction may be carried out in the dark is advantageous because it avoids the necessity for illuminating the interior of autoclaves in order to run these halogenations. It is possible by means of this invention to chlorinate organic compounds either alone or in solvents.

The following examples illustrate but do not limit the invention. All parts are given by weight except where otherwise noted. All yields given are calculated on the basis of the sulphuryl chloride used in the reaction.

Example I

A reaction mass consisting of 50 parts of cyclohexane, 27.4 parts of sulphuryl chloride and .05 part of benzoyl peroxide was refluxed for 30 minutes. An 80% yield was isolated when the reaction mixture was fractionated. The same yield was obtained when lauroyl peroxide was used in place of benzoyl peroxide and the reaction mixture was refluxed for only 15 minutes.

In further experiments with cyclohexane, it was found that the reaction in a reaction mixture containing 0.8 mol of cyclohexane, 0.6 mol of sulphuryl chloride and 0.001 mol of benzoyl peroxide was completed after the reaction mixture had been refluxed for 90 minutes. It was found that the chlorinated product consisted of 72% of chlorocylohexane and 28% of dichlorocyclohexane. In another experiment a reaction mixture containing 1.8 mols of cyclohexane, 0.6 mol of sulphuryl chloride and 0.001 mol of benzoyl peroxide was refluxed for 90 minutes. At the end of this time, it was found that a 98% yield had been obtained. The chlorinated product consisted of 89% of chlorocyclohexane and 11% of dichlorocyclohexane.

Example II

A reaction mixture containing 3 mols of n-heptane, 0.75 mol of sulphuryl chloride, and 0.001 mol of benzoyl peroxide was refluxed for one hour. At the end of this time it was found that a 90% yield had been obtained. The chlorinated product contained 15% of primary heptyl chloride and 85% of secondary heptyl chlorides.

Example III

A reaction mixture containing 2.5 mols of n-butyl chloride, 1 mol of sulphuryl chloride and 0.001 mol of lauroyl peroxide was refluxed for three hours. At the end of this time it was found that an 85% yield of chlorinated products had been obtained. The chlorinated reaction product contained 25% of 1,2-dichlorobutane, 50% of 1,3-dichlorobutane and 25% of 1,4-dichlorobutane.

Example IV

A reaction mixture containing 10 mols of propylene chloride, 2.5 mols of sulphuryl chloride and 0.005 mol of benzoyl peroxide was refluxed for 90 minutes. At the end of this time it was found that an 80% yield of chlorinated reaction product had been obtained. The chlorinated product contained 15% of 1,1,2-trichloropropane, 48% of 1,2,2-trichloropropane and 37% of 1,2,3-trichloropropane.

Example V

A reaction mixture containing 0.6 mol of n-propyl chloride, 0.2 mol of sulphuryl chloride and 0.002 mol of benzoyl peroxide was refluxed for four hours. At the end of this time it was found that an 85% yield of chlorinated products had been obtained. The chlorinated product consisted of 60% of 1,2-dichloropropane and 40% of 1,3-dichloropropane.

Example VI

A reaction mixture containing 0.3 mol of ethylene chloride, 0.3 mol of sulphuryl chloride and 0.002 mol of benzoyl peroxide was refluxed for two and one-half hours. At the end of this time it was found that a 70% yield of 1,2,2-trichloroethane was obtained.

Example VII

A reaction mixture containing three mols of n-propyl bromide, 0.75 mol of sulphuryl chloride and 0.001 mol of benzoyl peroxide was refluxed for two and one-half hours. At the end of this time it was found that a 90% yield of chlorinated products had been obtained. The chlorinated product contained 50% of 1-bromo-2-chloropropane, 30% of 1-bromo-3-chloropropane and 20% of a higher boiling unidentified product. No propyl chloride was detected in the reaction products.

Example VIII

A reaction mixture containing 0.4 mol of peroxide-free toluene, 0.2 mol of sulphuryl chloride and 0.0003 mol of benzoyl peroxide was refluxed for fifteen minutes. An 80% yield of benzyl chloride was thus obtained. This yield was calculated on the basis of the available chlorine utilized.

Example IX

A reaction mixture containing 0.4 mol of peroxide-free toluene, 0.4 mol of sulphuryl chloride, and 0.002 mol of benzoyl peroxide was gently refluxed. A vigorous reaction took place which was complete in less than thirty minutes. Then 0.4 mol of sulphuryl chloride and 0.002 mol of benzoyl peroxide were added to the reaction mixture and the refluxing was continued. In this case the reaction required three hours to reach completion. The product isolated at the end of this time was benzal chloride. In this case the toluene was chlorinated to give benzyl chloride and the benzyl chloride was in turn chlorinated to give benzal chloride.

Example X

A reaction mixture containing 0.4 mol of p-chlorotoluene, 0.2 mol of sulphuryl chloride and 0.001 mol of benzoyl peroxide was refluxed for 15 minutes. A 70% yield of p-chlorobenzyl chloride was thus obtained.

Example XI

A reaction mixture containing 0.8 mol of ethylbenzene, 0.2 mol of sulphuryl chloride and 0.001 mol of benzoyl peroxide was refluxed for fifteen minutes. An 85% yield of chlorinated ethylbenzene was thus obtained. The chief reaction product was alpha-chloroethylbenzene. A small amount of beta-chloroethylbenzene was probably formed.

Example XII

A reaction mixture containing 1.5 mols of isopropylbenzene, 0.3 mol of sulphuryl chloride, 0.001 mol of lauroyl peroxide and 0.75 mol of benzene was refluxed for ninety minutes. In order to minimize disubstitution, a 5:1 ratio of hydrocarbon to sulphuryl chloride was used. Benzene was used as a solvent to keep the temperature moderate throughout the reaction. After the reaction was complete, the benzene and excess isopropylbenzene were carefully removed under reduced pressure (21 mm.). The weight of the residual liquid indicated a yield of 95%. Ninety percent of the chlorinated product was alpha-chlorocumene and 10% of the chlorinated product was beta-chlorocumene.

Example XIII

A reaction mixture containing 0.6 mol of tertiary butylbenzene, 0.3 mol of sulphuryl chloride and 0.001 mol of benzoyl peroxide was refluxed for twelve minutes. A 70% yield of beta-chloro tertiary butylbenzene was thus obtained.

Example XIV

A reaction mixture containing 1 mol of meta-xylene, 0.3 mol of sulphuryl chloride, 0.001 mol of benzoyl peroxide and 0.7 mol of carbon tetrachloride was refluxed for thirty minutes. An 80% yield of meta-xylyl chloride was thus obtained.

Example XV

A reaction mixture containing 0.6 mol of isobutyric acid, 0.2 mol of sulphuryl chloride, 0.001 mol of lauroyl peroxide, and 0.2 mol of carbon tetrachloride was gently refluxed for one hour in the dark. The chlorinated reaction product contained 15% of alpha-chloroisobutyric acid and 85% of beta-chloroisobutyric acid.

Example XVI

A reaction mixture consisting of 36 parts of acetic acid, 40.5 parts of sulphuryl chloride, and 0.75 part of benzoyl peroxide was refluxed in the dark for 50 minutes. A 30% yield of chloroacetic acid was thus obtained.

Example XVII

In a run similar to the preceding example using 92.4 parts of carbon tetrachloride as a solvent a 50% yield of chloroacetic acid was obtained after refluxing had been continued for nine hours and 0.75 part of benzoyl peroxide had been added to the reaction mixture at the end of the third hour and again at the end of the sixth hour.

Example XVIII

A reaction mixture consisting of 59.2 parts of propionic acid, 54 parts of sulphuryl chloride, 61.6 parts of carbon tetrachloride, and 0.5 part of benzoyl peroxide was heated gently under reflux in the dark. After 90 minutes no more gas was evolved, and the reaction was considered to be complete. A 75% yield of monochloropropionic acids was thus obtained. The chlorinated product contained 45% of alpha-chloropropionic acid and 55% of beta-chloropropionic acid.

Example XIX

A reaction mixture consisting of 1 mol of propionyl chloride, 0.4 mol of sulphuryl chloride, and 0.002 mol of benzoyl peroxide was refluxed in the dark for three hours. Of the monochloropropionyl chlorides thus obtained 40% was the alpha isomer and 60% was the beta isomer.

Example XX

A reaction mixture consisting of 1.5 mols of n-butyric acid, 0.6 mol of sulphuryl chloride, 0.6 mol of carbon tetrachloride, and 0.001 mol of benzoyl peroxide was gently refluxed in the dark for one hour. Of the monochlorobutyric acids thus obtained, 10% was the alpha isomer, 45% was the beta isomer, and 45% was the gamma isomer.

Example XXI

A reaction mixture consisting of 1.5 mols of n-butyryl chloride, 0.6 mol of sulphuryl chloride, and 0.001 mol of benzoyl peroxide was gently refluxed in the dark for 45 minutes. Of the monochloro-n-butyryl chlorides thus obtained, 15% was the alpha isomer, 55% was the beta isomer, and 30% was the gamma isomer.

Example XXII

Trimethyl acetic acid (0.1 mol) was chlorinated smoothly with sulphuryl chloride (0.1 mol) in the presence of benzoyl peroxide (0.001 mol) to give monochloro-trimethyl acetic acid, which was isolated by fractionation under vacuum. The fraction boiling at 126-9° C. at 30 mm. was crystallized from low boiling ligroin in the form of plates melting at 40-42° C.

Example XXIII

Trimethyl acetyl chloride (0.2 mol) was reacted with sulphuryl chloride (0.2 mol) in the presence of benzoyl peroxide (0.001 mol). The reaction product, mono-chloro-trimethyl acetyl chloride, was isolated by fractionation (B. P. 85-86° at 60 mm.).

Example XXIV

A reaction mixture containing 1 mol of isobutyryl chloride, 0.4 mol of sulphuryl chloride, and 0.002 mol of benzoyl peroxide was refluxed in the dark for 4 hours. Of the monochloro-isobutyryl chlorides thus obtained, 20% was the alpha isomer and 80% was the beta isomer.

Example XXV

Methyl acetate was chlorinated in the dark with sulphuryl chloride in the presence of benzoyl peroxide. The yield of monochloro-methyl acetate was practically quantitative.

Example XXVI

Methyl propionate was readily chlorinated in the dark with sulphuryl chloride in the presence of benzoyl peroxide. A mixture of chlorinated products was thus obtained. Analysis of the monochlorinated reaction products indicated that 10% of the chlorine entered the methyl group, 20% of the chlorine replaced a hydrogen atom on the alpha carbon atom of the acid radical, and 70% of the chlorine was substituted on the beta carbon atom of the acid radical.

Example XXVII

When methyl butyrate was chlorinated in the dark with sulphuryl chloride in the presence of benzoyl peroxide, it was found that a mixture of the methyl esters of alpha-, beta-, and gamma-chlorobutyric acids was obtained. Only a very minute quantity of product containing chlorine substituted in the methyl group of the ester was obtained.

When one is chlorinating carboxylic acids, carboxylic acid halides, and alkyl esters of carboxylic acids as described in Examples XV to XXVII, it is imperative that the reaction be carried out in the dark. It is necessary to observe this precaution in order to suppress other possible reactions of sulphuryl chloride and to obtain an optimum yield of chlorinated reaction products.

In place of benzoyl peroxide or lauroyl peroxide we may use heptoyl peroxide, octoyl peroxide, caproyl peroxide, triacetone peroxide, ascaridole, peroxidized butyraldehyde, peroxidized benzaldehyde, and other similar organic peroxides. Some organic peroxides promote the reaction between some organic compounds and sulphuryl chloride better than others. What organic peroxide is best to use depends upon the compound to be chlorinated and other reaction conditions.

The chlorination of carboxylic acids is a vigorous reaction, and hence it has been found desirable to add a small quantity of a diluent (carbon tetrachloride or benzene) to moderate the rate of the reaction.

The use of a solvent or a diluent is advantageous in a few other cases, as in the chlorination of solid materials and for lowering the reaction temperature. The solution must be kept refluxing throughout the reaction so that the vapors of the boiling solution will keep the oxygen of the air, which strongly inhibits the reaction, away from the reaction mixture. By using a low-boiling solvent, it is possible to accomplish this at a lower temperature and thus minimize the possibilities of secondary reactions of sulphuryl chloride with the compound. When chlorinating toluene with sulphuryl chloride in the presence of a peroxide, it is suitable to use such diluents as methylene chloride, chloroform, carbon tetrachloride, benzene, chlorobenzene, and o-dichlorobenzene. It has been found advantageous to use benzene as a solvent when isopropylbenzene is being chlorinated and to use carbon tetrachloride as a solvent when m-xylene is being chlorinated.

It has been found that the chlorination of volatile compounds, such as n-propyl chloride, proceeds rather slowly, due to the slow rate of decomposition of benzoyl peroxide at the refluxing temperature. This rate of chlorination can be increased in two ways—by using a less stable peroxide, such as lauroyl peroxide, or by raising the boiling point of the reaction mixture. The latter can be accomplished by adding a suitable diluent of relatively high boiling point, such as chlorobenzene or o-dichlorobenzene, or by working under pressure.

Among the advantages of this invention are that it permits chlorinations to be carried out more completely and in the absence of light, and that it also permits one to obtain purer compounds than are obtainable by conventional methods. A theoretical distinction between this invention and the prior art lies in the fact that by this method chlorinations depend upon a chain reaction initiated by organic peroxides and involving chlorine atoms as chain carriers, whereas conventional chlorination methods depend upon the use of molecular chlorine and light.

By this invention it is possible to chlorinate more quickly than by ordinary chlorination methods and it is also possible to carry out certain chlorinations not possible by other methods. Thus the ordinary photochemical chlorination of aromatic hydrocarbons containing side chains usually leads to impure products due to simultaneous nuclear chlorination. By the use of this reaction, it is possible in some cases as with meta-xylene and tertiary butylbenzene to obtain side chain chlorination without simultaneous nuclear chlorination.

The chlorination of the side chain of meta-xylene with chlorine gas and sunlight to form meta-xylyl chloride is accompanied by the formation of at least 10% of 4-chloro-meta-xylene under the most favorable conditions. The separation of these two products by fractionation is difficult. Chlorination of meta-xylene with sulphuryl chloride and peroxides yields only meta-xylyl chloride.

Tertiary-butylbenzene is another compound whose chlorination is better effected by the use of sulphuryl chloride than by the ordinary photochemical chlorination method. As a matter of fact, the side chain of this hydrocarbon is so unreactive toward halogens that it is impossible to obtain the halogen derivatives directly. Conditions under which reaction occurs with the halogens lead only to nuclear substitution products. However, by the use of a peroxide and sulphuryl chloride, the side chain can be chlorinated with ease.

The above description and examples are intended to be illustrative only and not to limit the scope of the invention. Any variation or modification of the invention which falls within the spirit and scope of the appended claims is to be regarded as an embodiment of the invention.

We claim:

1. A process of chlorinating an organic compound containing an aliphatic-$CH_2$-group and selected from the class consisting of alicyclic hydrocarbons, aliphatic compounds that contain a methylene group, and alkyl substituted benzenes and their monochloro substitution products which comprises heating a liquid reaction mixture containing said compound, sulphuryl chloride and a catalytic proportion of an organic peroxide.

2. A process of chlorinating an alkyl substituted benzene which comprises refluxing a liquid reaction mixture containing said alkyl substituted benzene, sulphuryl chloride and a catalytic proportion of an organic peroxide.

3. A process as defined in claim 2 in which the organic peroxide in the reaction mixture is benzoyl peroxide.

4. A process as defined in claim 2 in which the organic peroxide in the reaction mixture is lauroyl peroxide.

5. A process of chlorinating an aliphatic compound that contains a methylene group which comprises refluxing a liquid reaction mixture containing said aliphatic compound, sulphuryl chloride and a catalytic proportion of an organic peroxide.

6. A process as defined in claim 5 in which the organic peroxide in the reaction mixture is benzoyl peroxide.

7. A process as defined in claim 5 in which the organic peroxide in the reaction mixture is lauroyl peroxide.

8. A process of chlorinating an aliphatic carboxylic acid that contains a methylene group which comprises refluxing in the dark a liquid reaction mixture containing said carboxylic acid, sulphuryl chloride and a catalytic proportion of an organic peroxide.

9. A process of making monochloro-trimethyl acetic acid which comprises refluxing in the dark a liquid reaction mixture containing trimethyl acetic acid, sulphuryl chloride and a catalytic proportion of benzoyl peroxide.

MORRIS S. KHARASCH.
HERBERT C. BROWN.